United States Patent [19]

Krause et al.

[11] 3,940,971

[45] Mar. 2, 1976

[54] SYSTEM FOR TESTING FLOW METERS

[75] Inventors: Marvin W. Krause; Donald H. Strobel, both of Cedarburg; Edward A. Seruga, Milwaukee, all of Wis.

[73] Assignee: Badger Meter, Inc., Milwaukee, Wis.

[22] Filed: Nov. 1, 1973

[21] Appl. No.: 411,712

[52] U.S. Cl. .................................................. 73/3
[51] Int. Cl.² ........................................ G01F 25/00
[58] Field of Search .............................. 73/3, 231 M

[56] References Cited
UNITED STATES PATENTS

| | | | |
|---|---|---|---|
| 3,125,879 | 3/1964 | Porter, Jr. .................................. | 73/3 |
| 3,631,709 | 1/1972 | Smith et al. ................................ | 73/3 |
| 3,808,543 | 4/1974 | Mueller .......................... | 73/231 R X |
| 3,888,106 | 6/1975 | Last et al. ................................. | 73/3 |

Primary Examiner—Donald O. Woodiel
Assistant Examiner—John S. Appleman
Attorney, Agent, or Firm—Neuman, Williams, Anderson & Olson

[57] ABSTRACT

Liquid is supplied to a meter test stand at a uniform pressure, and the flow through the meters on the stand automatically is directed to each of three receptacles in sequence at three different flow rates during each test cycle. Level sensors in each receptacle actuate cycling controls and actuate sensing and recording components. The latter components monitor the rate of flow registration of the meters on test and provide an accurate comparison by percent of the measured flow rate to the actual flow rate. A high degree of accuracy is achieved through the use of a phase locked loop and digital control system which responds to the level sensing and cycling controls to provide a print-out of the comparison as a measure of accuracy of the meter at each such flow rate.

9 Claims, 5 Drawing Figures

SYSTEM FOR TESTING FLOW METERS

This invention pertains to the testing of flow meters and particularly to a system and method for automatically and accurately determining the accuracy of the flow measuring operation of liquid meters at a plurality of preselected flow rates.

A standard procedure for production testing of flow meters, and particularly water meters, is to perform a volumetric test at three different flow rates, i.e., at the maximum, intermediate and minimum flow rates of the normal operating range of the meter, to determine the meter's overall efficiency or accuracy of flow measuring response. The accuracy of the test results depends upon the test system used. Common testing practices have relied upon an operator manipulating controls and observing the level of liquid in tanks and observing meter register readings for determining the meter accuracy. Such systems are dependent upon the operator's alertness and accuracy of visual observations and the operator's visual and physical coordination. These factors introduce significant probable testing errors. Typically, attempts are made to reduce the probable testing errors by using large total volumes of flow for each test and concomitant long testing times. However, such practices result in slow, relatively cumbersome and rigid test procedures.

Various devices and procedures have been proposed for facilitating volumetric liquid meter testing operations. Plumbing systems with valve controls for different predetermined flow rates have been proposed in manual systems, such as shown and described in Kidder U.S. Pat. No. 1,103,882. Test stands have been provided for simultaneously connecting and testing a plurality of meters, either in completely manual systems or with automatic means for shutting off test flow, see e.g., Ford et al. U.S. Pat. No. 2,631,451 Ford U.S. Pat. No. 2,635,454 and Smith et al. U.S. Pat. No. 3,631,709. Systems also have been proposed in which recording instruments are actuated and de-actuated in response to the liquid level in a receptacle for providing a predetermined volume of test flow during steady flow conditions, such as suggested in Bennett U.S. Pat. No. 2,510,327 and Charbonnier U.S. Pat. No. 3,324,707.

However, systems of the prior art have exhibited shortcomings or problems which it is an object of this invention to overcome. The earlier systems relied essentially upon manual operation and observation, with the interrelated problems of accuracy, volume and time as noted above. Later systems which suggest greater degrees of automation and sophistication of measurement, such as in the Charbonnier U.S. Pat. No. 3,324,707 and the Smith et al. U.S. Pat. No. 3,631,709, still did not provide fully automated dynamic testing over the usual plurality of test rates. Moreover, the measuring and comparing apparatus of the latter patents essentially rely on counting of the cycles of operation of each meter, which results in certain inherent problems of accuracy of results, as outlined at least in part in the Charbonnier patent, e.g., beginning at column 3, line 71.

It is an object of this invention to provide improved apparatus and methods for testing flow meters.

It is a further object of this invention to provide improved dynamic testing systems for testing flow meters.

It is another object of this invention to provide an improved flow meter testing system which provides automatic control of the test cycle and of measurements in a manner which avoids operator errors of reading and interpretation.

It is a more specific object of this invention to provide a liquid flow meter testing system which provides accurate volumetric test results with small quantities of liquid relative to the flow rate at which the tests are conducted.

It is a further object of this invention to provide a flow meter test system which automatically provides accurate test results in the form of a printed record.

Further and additional objects and advantages will appear from the description, accompanying drawings and appended claims.

In carrying out this invention in one illustrative form an automatic system and method are provided for testing magnetic-drive liquid flow meters under a plurality of different dynamic flow conditions and for providing a printout of the results of the test under each flow condition. Liquid is supplied to a series of meters on a test stand. From the test stand, the fluid is permitted to flow, in sequence, to each of a plurality of receptacles at different flow rates. Liquid level sensors associated with the receptacles actuate controls for valves which automatically control the test cycle and sequence and actuate sensing and print out components during each test. A magnetic field sensor is positioned adjacent each meter magnetic drive for sensing the flow measuring operation of that meter during the periods of flow of predetermined volumes of liquid as determined by the liquid level sensors of each receptacle. An oscillator, phase locked and synchronized to the meter sensor signal, provides a pulse train at a frequency which is proportional to but at least an order of magnitude in excess of the frequency of the sensor signal. Measured against known standards for a given rate and volume of fluid flow, these pulses provide an accurate comparison of meter operation to the ideal. The comparison values are printed on appropriate forms to provide a record of the performance accuracy of each meter at each tested flow rate.

For a more complete understanding of this invention, reference should now be had to the embodiment illustrated in greater detail in the accompanying drawings and described below by way of an example of the invention. In the drawings, FIG. 1 is a schematic plumbing diagram of a liquid flow meter testing system employing teachings of this invention;

Figure 1:
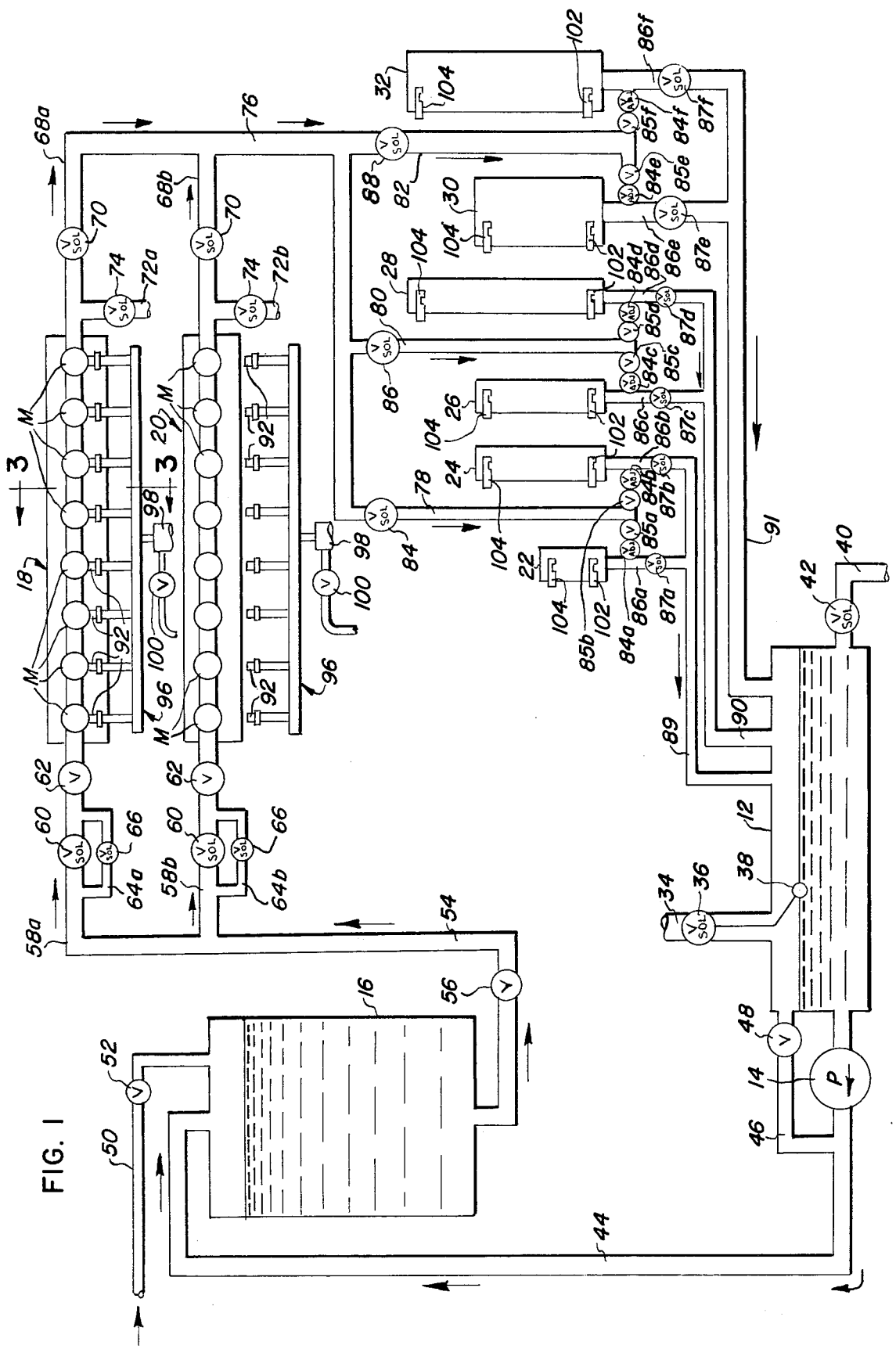

Referring first to FIG. 1, the illustrated plumbing system 10 is designed for testing water meters and includes a storage tank 12, a pump 14, a pressure tank 16, a pair of meter test stands 18 and 20 connected in parallel in the system, and measuring or prover tanks 22, 24, 26, 28, 30 and 32. The tanks 22 and 24 sometimes will be referred to hereinafter as the "low volume" or "low rate" tanks or receptacles. The tanks 26 and 28 similarly may be referred as the "intermediate volume" or "intermediate rate" tanks or receptacles, and the tanks 30 and 32 may be referred to as the "high volume" or "high rate" tanks or receptacles.

A water supply conduit 34 leads from a suitable source of water to the tank or reservoir 12. The line 34 is provided with a fill valve 36 controlled by an electrical solenoid in response to the level of water in the tank 12, as determined by a float control indicated at 38. A drain conduit 40 is provided with a thermally controlled solenoid valve 42 to maintain the water below a predetermined temperature e.g., 68°F., under prolonged testing operations by draining off water from the tank 12 and thereby admitting cooler make-up water through line 34.

The pump 14 is provided in a feed conduit 44 leading from the tank 12 to the pressurized supply tank 16. A bypass or recirculating line 46 includes a manually operated valve 48 and is connected between the downstream side of the pump and the tank 12. An air supply conduit 50 includes a manually operated supply valve 52 and is connected with the tank 16. The pressure tank 16 is of a large capacity, e.g. 500 gallons, relative to the volume of water utilized in each test cycle, and supplies water to the test stands at a substantially constant pressure throughout each test. To this end, the tank 16 may be charged with a predetermined volume of air under pressure through line 50 and with adequate water from pump 14 to compress the contained air to a desired supply pressure and volume, with a concomitant water level being established in the supply tank. Thereafter, the pump 14 is suitably controlled in accordance with water usage demand by known automatic controls to maintain a substantially constant supply pressure, which may be checked visually as through a sight glass column or pressure gauge.

A supply conduit 54, which includes a manually operated valve 56, leads from the tank 16 to a pair of input conduits 58a and 58b connected with the inlets of two test stands 18 and 20. Each line 58a and 58b includes a solenoid controlled primary main valve 60 and a manually-operated valve 62. Secondary main conduits 64a and 64b bypass the respective primary main valves 60, and each is provided with a solenoid operated secondary main valve 66.

Each test stand 18 and 20 may be of a generally known construction, e.g., so-called "Ford" test stands. Such stands include provision for inserting a meter M between each adjacent pair of a series of connectors, then clamping the combination of meters and connectors as well as inlet and discharge conduits together longitudinally to connect all of the meters M in series with one another and with the inlet and discharge conduits. The clamping and release movement and sealing force may be provided by any appropriate means, such as a hydraulic piston (not shown) normally included as a part of such a stand. In the subject system, a solenoid control preferably is provided for the clamping and release piston for operation from a main control panel, as will be noted below with respect to FIG. 4.

The discharge sides of the stands 18 and 20 are connected to discharge main conduits 68a and 68b, respectively, each of which includes a solenoid controlled post main valve 70. Intervening drain lines 72a and 72b are provided with solenoid controlled pressure relief valves 74 for purging the meters of air and contaminants prior to the operating test and for relieving hydraulic pressure within meters on a stand after a test cycle and prior to opening of the connector system for removal of the tested meters. The discharge conduits 68a and 68b communicate with a main conduit 76 which in turn is connected with a series of branch conduits 78, 80 and 82 leading to the receptacles 22–32, as shown. Solenoid controlled valves 84, 86 and 88 sometimes referred to hereinafter as "low fill", "intermediate fill" and "high fill" valves, respectively, are provided in the lines 78, 80 and 82.

Each branch conduit is connected to two of the receptacles or tanks, conduit 78 being connected with tanks 22 and 24, conduit 80 being connected with tanks 26 and 28, and conduit 82 being connected with tanks 30 and 32. A manually adjustable valve, 84a –84f, and a fixed manual valve, 85a –85f, are interposed between each of these tanks and the respective conduit as shown. During each test cycle, liquid is passed through the meters M on the stand 18 or 20 being used and, in sequence, to one of the high volume tanks, to one of the intermediate volume tanks, and to one of the low volume tanks, as will be described further below. In each instance, the tank of each pair to which the flow is directed is determined by the prior opening and closing of the appropriate valves 85a –85f, and the rates of flow are determined by the prior adjustment settings of the respective adjustable orifice valves 84a –84f.

Drain lines 86a –86f are connected between the tanks 22–32 and drain lines 89, 90 and 91 which extend to the storage tank 12. Solenoid controlled drain valves 87a –87f are included in the lines 86a –86f.

Each of the solenoid controlled valves may be of any appropriate type to be actuated by a remote signal. By way of one specific example, each of these valves may be pneumatically operated with the solenoid control actuating an air valve between an operating air line and the respective pneumatic operating mechanism in a known manner.

Figure 3:
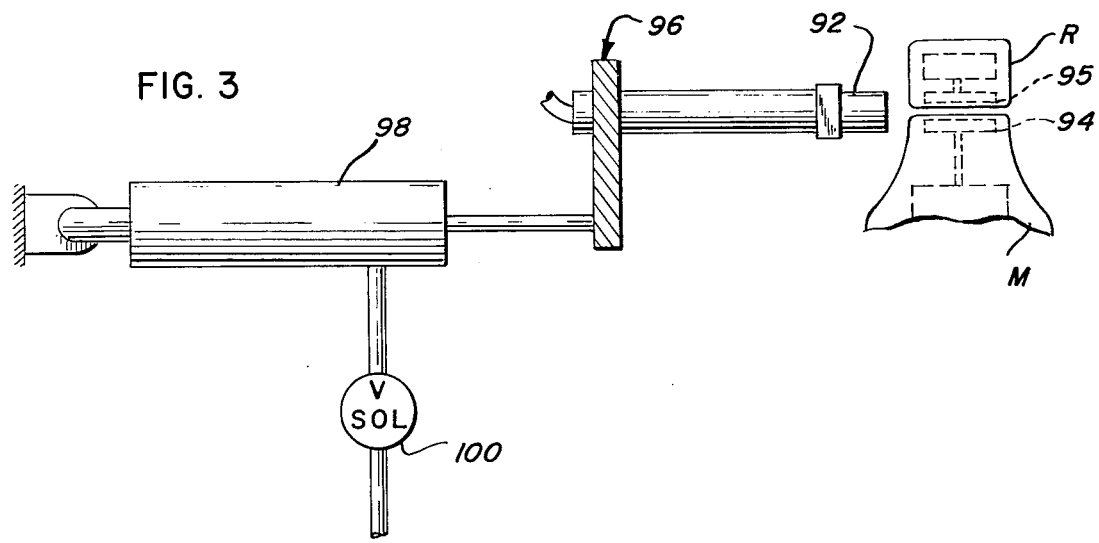
FIG. 3 is a partial elevation view taken generally on the line 3—3 of FIG. 1 and schematically illustrating the arrangement for mounting and moving a set of sensors.

The illustrated system is designed for use with meters M of the type which include a magnet or magnets that are rotated by the volumetric measuring components, for example as disclosed in Kullman U.S. Pat. No. 3,248,583. When such a meter is in operation, rotation of the magnet and the attendant movement of successive north and south poles past a given point adjacent the magnet rotating path is a direct indication of the flow measuring operation of the meter. In the subject system, such movement of the magnet, and thus the measuring operation of each meter, is sensed by a magnetic field sensor probe 92 positioned adjacent each meter. Referring to FIG. 3, as well as to FIG. 1, each sensor 92 is positioned near the inner drive magnet 94 of the respective meter M, generally in the plane of the interface between the drive magnet 94 and the driven magnet 95 of a test register R on the meter, to sense and respond to the rotation of the drive magnet 94 as the direct indication of the operation of the flow measuring components of each meter. Each of the sensors 92 includes a sensing component for sensing the magnetic flux changes at the probe location as the respective meter magnet rotates. By way of one example, a sensing component or "chip" which is activated by the Hall effect to generate an electrical signal through appropriate circuitry may be mounted in the outer end of each sensor 92, and be connected with an associated electronic comparison and read-out system as will be described further below. One such sensing component is a magnetic field change-to-voltage transducer sold by American Aerospace Controls, Inc. under the designation Model HI-5 Hall Generator and which provides a voltage output signal correlated to the sensed rate of change of flux.

The sensors 92 are mounted as a gang on a common support or rack 96 for movement between an operating position adjacent the meters as shown at stand 18 in FIGS. 1 and 3, and a retracted position as shown at stand 20 in FIG. 1 for convenient access in removing and replacing the meters on the stands. A pneumatically-operated piston and cylinder unit 98 is provided to afford such advancement and retraction positioning movement of each gang of sensors with a solenoid valve control unit 100.

Each of the tanks 22–32 is provided with a pair of sensors, comprising a lower level sensor 102 and an upper level sensor 104, for providing electrical output signals when the liquid level in the respective tank is at predetermined levels. One such probe presently available commercially and which is capable of measuring liquid levels to an accuracy of about 0.002 inches is an ultrasonic sensor Model No. 300 sold by National Sonics Corporation of Farmingdale, N.Y., under the name Sensall. The tanks preferably are of appropriate horizontal cross-sectional configurations to facilitate accurate volume measurement by sensing the liquid levels, e.g., by providing appropriate cross-sectional area to volume relationships and by avoiding turbulence and other adverse effects which might detract from accurate volume measurements. Each tank, and particularly the positions of the two sensors in each tank, is accurately calibrated such that the volume represented by the difference between the liquid levels sensed by each pair of upper and lower sensors is an accurately fixed predetermined volume.

Figure 2:
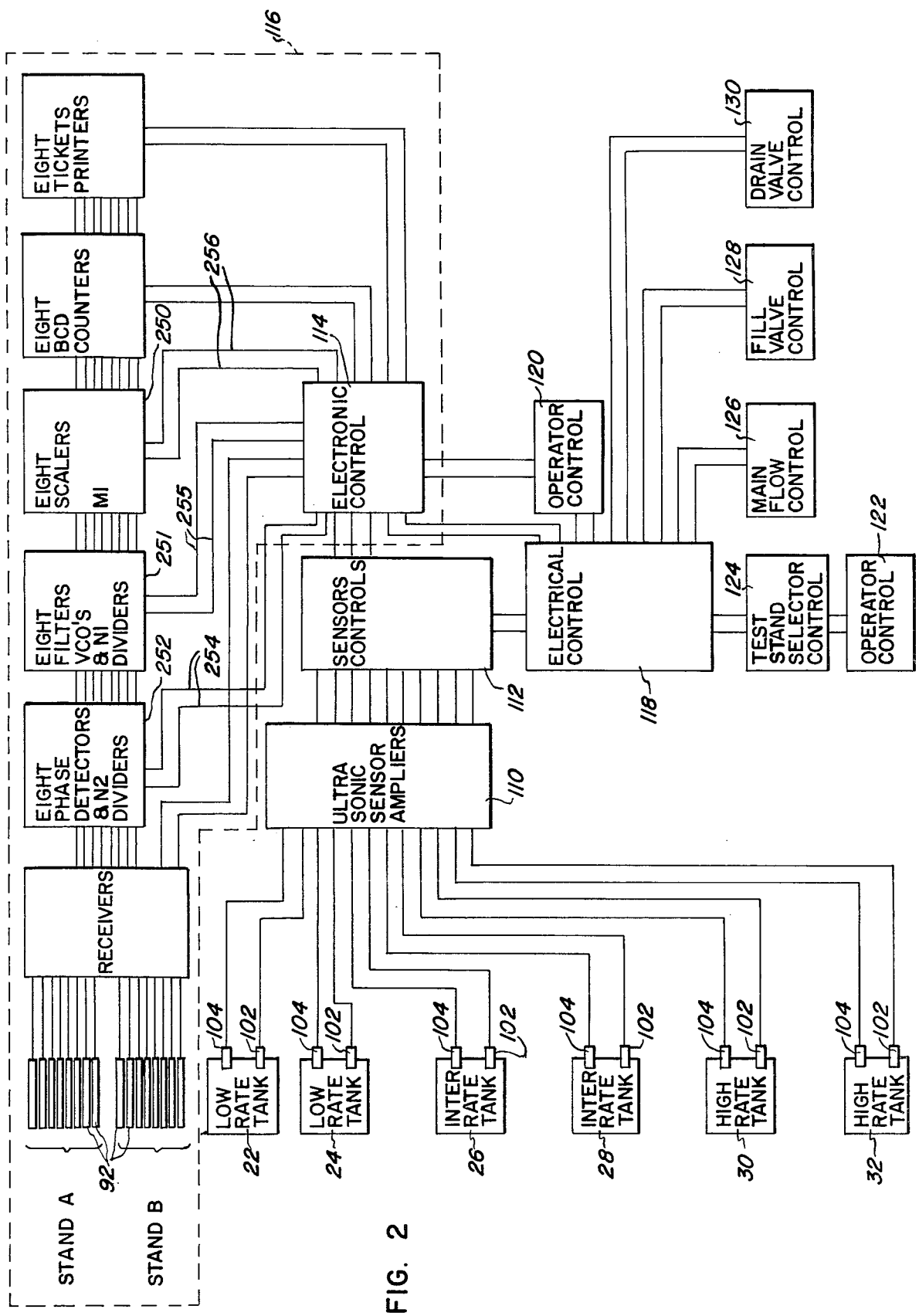
FIG. 2 is a schematic diagram of a sensing and control system for use with the plumbing system of FIG. 1 and employing teachings of this invention.

The overall cycle control and meter accuracy determining system is illustrated schematically in FIG. 2. The control and comparison inputs of the system, in addition to the known volume of each test tank and the related preset flow rates, are the signals from the several liquid level sensors 102 and 104, and the meter operation signals from sensors 92. With continuing reference to FIG. 2, the twelve liquid level sensors 102 and 104 are connected to six amplifiers and related signal shaping circuits at 110. The amplified signals are transmitted from the amplifiers to sensor output controls at 112 which may comprise the tank select gates 152 and related controls which are discussed further below with reference to FIG. 5. The controls 112 are suitably programmed to provide sequencing control signals to the electronic control section 114 of the accuracy determining system 116 and to a cycle control section 118 in accordance with the signals received from the individual level sensors 102 and 104. A particular preferred and advantageous accuracy determining and control system is discussed in considerable detail below. However, for present purposes it is adequate to note that the system 116 monitors the actual measuring operation of each meter, as indicated by the signals from sensors 92, during the flow of the known test volume of the respective tank used during each test flow rate operation and provides a printed output of a comparison of the measured flow with the actual flow. This output shows the accuracy of each meter at each test flow rate, and is in terms which conform to traditional meter accuracy reporting in that it represents measured flow volume as a percentage of actual flow volume for each meter at each test flow rate.

The control section 118 includes conventional sequencing components, such as solenoid operators and shift registers, for automatically carrying out the hereindescribed operations. This section 118 receives control signal inputs from the sensor controls 112, from the control section 114, from operator cycle controls at 120 and 122, and from a test stand control 124 which is set by the operator in accordance with the test stand 18 or 20 to be used in a particular test cycle. The control section 118 in turn controls the aforenoted test stand closure piston and main flow valves 60, 66, 70 and 74, indicated collectively at 126, the solenoid operators of the fill valves 84, 86 and 88, indicated collectively at 128, and solenoid controls for the drain valves 87a–87f, indicated collectively at 130. All of these flow, fill and drain valve controls are set for the valves to be normally closed, except for the pressure relief valves 74 which are normally open.

Prior to test operations, the adjustable valves 84a–84f are set to provide various predetermined flow rates desired for testing meters within given flow measuring ranges. The system then is set for testing meters of a specific capacity range by setting the fixed manual valves 85a–85f to admit flow through the appropriate three flow rate valves 84a–84f and to the respective receiving tanks as desired for the low, intermediate and high rate tests of those particular meters, and to close the lines to the other receiving tanks. Reference parameters corresponding to the low, intermediate and high flow rates selected and to the volumes of the prover tanks being used also are set into the comparison system 118, as will be noted further below. By way of example only, the following table illustrates a matrix of settings for five different test cycles of three different flow rates each, using six prover receptacles and related rate valves. In each instance, the valves 85 leading to the prover tanks not listed are closed.

TABLE I

| METER SIZE | TEST | VALVE/ TANK | FLOW RATE, GPM | PROVER VOLUME, CU. FT. | FLOW TEST TIME, MIN. | TOTAL FLOW TIME, MIN. |
|---|---|---|---|---|---|---|
| 15 gpm | Low | 84a/22 | 0.125 | 0.05 | 2.992 | |
| | Inter. | 84c/26 | 0.75 | 0.1 | 0.997 | 4.986 |
| | High | 84e/30 | 15.0 | 2.0 | 0.997 | |
| ⅝″ | Low | 84b/24 | 0.25 | 0.1 | 2.992 | |
| | Inter. | 84d/28 | 2.5 | 0.5 | 1.496 | 5.236 |
| | High | 84e/30 | 20.0 | 2.0 | 0.748 | |
| 25 gpm | Low | 84b/24 | 0.25 | 0.1 | 2.992 | |
| | Inter. | 84c/26 | 1.0 | 0.1 | 0.748 | 5.236 |
| | High | 84f/32 | 25.0 | 5.0 | 1.496 | |
| ¾″ | Low | 84b/24 | 0.5 | 0.1 | 1.496 | |
| | Inter. | 84d/28 | 2.5 | 0.5 | 1.496 | 4.236 |
| | High | 84f/32 | 30.0 | 5.0 | 1.244 | |

TABLE I-continued

| METER SIZE | TEST | VALVE/ TANK | FLOW RATE, GPM | PROVER VOLUME, CU. FT. | FLOW TEST TIME, MIN. | TOTAL FLOW TIME, MIN. |
|---|---|---|---|---|---|---|
| 40 gpm | Low | 84b/24 | 0.5 | 0.1 | 1.496 | |
| | Inter. | 84d/28 | 2.5 | 0.5 | 1.496 | 3.927 |
| | High | 84f/32 | 40.0 | 5.0 | 0.935 | |

Figure 4:
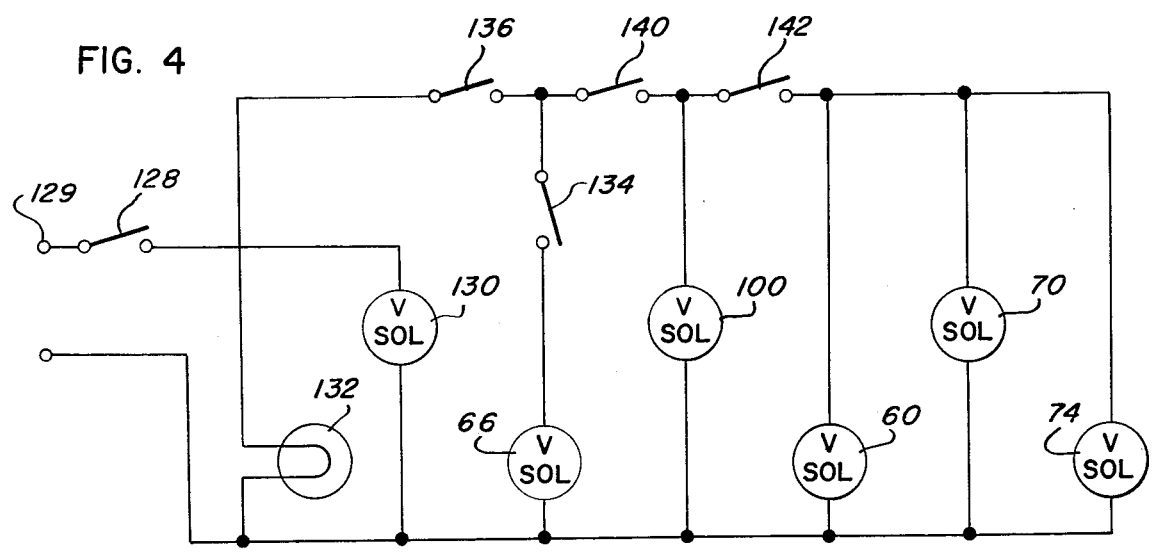
FIG. 4 is a schematic diagram of a primary flow control circuit of a system as in FIG. 1.

Referring to FIG. 4 for a particular example of an appropriate switching circuit for the primary flow controls, control 122 closes a relay switch 128, from a power source 129, which activates the stand closing piston control 130 and lights an indicator 132 as well as closing a relay switch 134. As the test stand reaches the closed position, a limit switch 136 is closed which completes the circuit to the control for opening the secondary main valve 66 for purging the meters on the stand. Operation of the "start" control 120 then provides a logic output which closes switch 140 which actuates the valve 100 for advancing the respective sensor rack 96. As this rack reaches its forward position it closes a limit switch 142 which activates the solenoids to open the main flow valves 60 and 70 and to close the respective relief valve 74.

In a testing operation, a series of meters M are loaded on one of the test stands, with the sensors 92 retracted, as at stand 20 in FIG. 1. Registers may be positioned on the meters if desired to provide a check of the register drive capability of the meters during the test. Control 122 is manipulated which closes the respective stand for clamping the meters and related conduits together and opens the secondary main valve 66 to purge the meters to the respective drain line 72a or 72b. Control 124 is set in accordance with the test stand being used for the particular test. It will be assumed here that stand 20 is being used for the test, with the system set to use rate valves 84a, 84c and 84e and the respective prover tanks 22, 26 and 30. Tickets or tags to receive the printout of the accuracy tests on each meter are inserted in the printer 214 of the system 116. The rack of sensors is advanced to the sensing position and the liquid flow test then is initiated by manipulating control 120. The respective relief valve 74 closes, and the primary and post main valves 60 and 70 of the stand are opened. The high rate tank fill valve 88 and the drain valve 87c of the medium rate tank also are opened. At the same time, the drain valve 87e of high volume tank 30 is closed. Pump 14 is operated automatically in accordance with the demand to maintain the supply in pressure tank 16.

As the water flows into the tank 30 and the level reaches the lower sensor 102 therein, the system 116 is actuated to initiate the high flow rate test comparison. When the liquid level reaches the upper sensor 104 of tank 30, that sensor provides a signal which activates the controls to terminate the high flow rate test comparison, and at the same time to close drain valve 87c of the intermediate tank 26 and close high rate fill valve 88. The intermediate rate fill valve 86 and the low rate tank drain valve 87a are opened simultaneously. When the liquid level in tank 26 reaches the lower level sensor 102 the measuring comparison system 116 is actuated for the intermediate flow rate accuracy determination. When the liquid level reaches the upper sensor 104 of the tank 26, the intermediate flow rate accuracy comparison test is terminated, the intermediate fill valve 86 and the drain valve 87a of the low volume tank 22 are closed, and the low rate fill valve 84 is opened. The drain valve 87e of the large volume tank is opened simultaneously. As the low volume tank fills, the sensors 102 and 104 of the tank are triggered in sequence to initiate and terminate the comparison operation of the system 116 during the flow required to fill tank 22 between these two sensors. When the liquid level reaches sensor 104 of the low rate tank, the low fill valve 84, primary main valve 60, secondary main valve 66, and post main valve 70 all are closed, and the pressure relief valve 74 of the stand on test is opened. The test then is complete, and the controls are automatically actuated to retract the sensors and to open the test stand.

The results of each flow rate accuracy test of each meter are printed on a ticket or tag inserted in the respective section of the printer. When the test is completed, a separate record thus is obtained of the high, intermediate and low flow rate test results for each meter.

Figure 5:
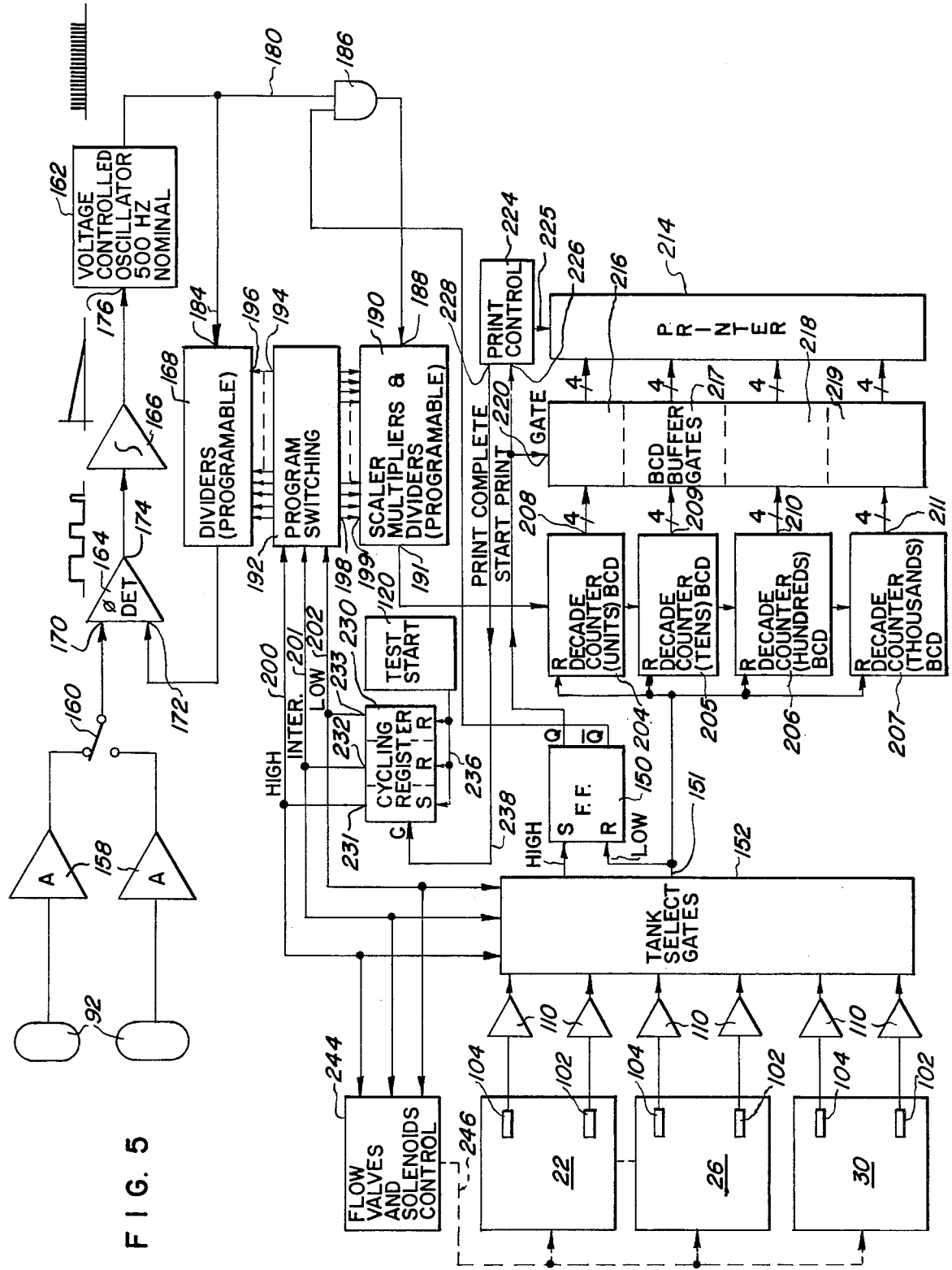
FIG. 5 is a schematic diagram, including some electrical circuitry, of one channel of an accuracy determining and control system employing teachings of this invention.

Turning now to FIG. 5, there is shown in diagrammatic form one of the eight electronic accuracy determining systems referred to above and illustrated at 116 of FIG. 2 for simultaneously and separately determining the accuracy of each of eight meters connected in series on a test stand 18 or 20. As stated above, a given test cycle is preceded by the selection of high, intermediate and low flow rates and corresponding fluid receptacles, such as the tanks 22, 26 and 30 of the foregoing example, as shown in FIG. 5. The receipt of a predetermined volume of liquid in each of the tanks is defined by the generation of a pair of signals from the low and high level sensors 102 and 104 provided for each tank. After appropriate amplification in the shaping and amplification circuits 110, the level sensing signals from each tank are selectively coupled to the S and R inputs of a control flip-flop 150 via tank select gates 152 controlled in accordance with the selected flow rate in a manner hereinafter set forth.

For the purpose of producing a first rate signal at a frequency corresponding to the actual rate of measurement by a tested meter, a magnetic sensor 92 is positionable adjacent each meter housing, e.g., as in FIGS. 1 and 3, to utilize the concentration of magnetic flux available at the respective meter magnet 94. A pair of the magnetic sensors 92 are shown in FIG. 5, along with appropriate signal shaping and amplification circuits 158 to illustrate the fact that identical tests at the high, intermediate and low flow ranges are performed on a meter on each of the stands 18 and 20 by each comparison and print out system. A separate sensor 92 and amplification circuit 158 is associated with each meter on each stand. A conventional switching device, represented at 160 may be manually or automatically actuated to switch each testing system from one stand to the other. It will be appreciated that all of the systems are switched simultaneously by control 124 in accordance with the stand in use for a given test operation.

Various known meter testing systems count the pulses received from a magnetic sensor such as that shown at 92 to provide an indication of actual meter performance, as noted above. However, even with meter magnets having four poles, the number of pulses received during a desirably short measuring interval is small, and hence the resolution available in the resulting measurements is quite poor.

Therefore, as an important feature of the present invention, there is provided in each measuring channel a controlled oscillator means responsive to the pulse train or rate signal received from the sensor amplification circuit 158 for producing a second pulse train or rate signal having a frequency proportional to but at least an order of magnitude in excess of the frequency of the sensor signal. More specifically, the present invention incorporates a voltage controlled oscillator 162 providing an output signal which is phase locked in synchronism with the rate signal provided by the magnetic sensor 92 but which provides, during a given timed interval, at least ten times, and typically a hundred or a thousand times, as many pulses as occur at the sensor 92.

The oscillator 162 is part of a phase lock loop which includes a phase detector 164, an integrator 166, and a frequency divider circuit 168. The detector 164, of conventional design, compares the phase of the meter magnetic rate signal occurring at its input 170 to the phase of the loop reference signal occurring at an input 172 and provides at an output 174 a train of pulses increasing or decreasing in pulse width, and therefore DC content, depending upon whether the sensor rate signal leads or lags respectively the fedback reference signal. The loop integrator 166, which typically will include one or more low pass filter sections, receives the phase detector output signal and effectively extracts the DC content thereof for controlling the frequency of the voltage controlled oscillator 162 about a quiescent or center frequency $f_o$ through an input at 176.

The output signal from the oscillator 162 appears on a line 180 from which it is fed back into an input 184 to the divider 168. The divider 168 is programmable (capable of being set to various division ratios) for reasons hereinafter set forth in detail, but has as its general purpose the reduction of the frequency from the oscillator 162 to approximately the frequency of the sensor rate signal at the input 170 of the phase detector 164. For reasons to be explained, the quiescent or center frequence $f_o$ of the output signal from the oscillator 162 will nominally be at or around 500 Hz. If the sensor rate signal occurring at the detector input 170 occurs at a frequency of 1.0 Hz, a multiplication factor of 500 must effectively occur in advance of the output from the oscillator 162. This desired result is accomplished merely by programming a divider factor of 500 in the divider 168 of the phase lock feedback loop.

The oscillator output signal occurring on line 180 is selectively coupled via a gate 186 to the input 188 of a series of programmable digital multiplication and division circuits represented diagrammatically at 190. As will become apparent, the digital frequency multipliers and dividers 190 reduce the frequency or divide the number of pulses from the oscillator 162 by integer division factors and also apply to the quotient of the division function a scaler or multiplication factor such as 0.8866 or the like. Programmable division and multiplication devices have become well known in the art. Hence the gating and counting circuits used for this purpose are not shown in detail. Suffice it to say that the division function of the circuits 168 and 190 are provided by commercially available devices such as device CD4018AE of the COS/MOS series devices sold by Radio Corporation of America. Each of these devices used individually provides a selected division factor of from 0 to 9, and connected in tandem three of these devices provide a selected division factor of from 0 to 999. The devices are "programmed" by the provision of an appropriate digital code at a series of control inputs available for each device. The "scaling" or multiplication function is similarly accomplished through the use of commercially available devices such as scaler units SD5220D available from Solid State Scientific Corporation. Each of these units effectively multiplies the frequency of its input signal by a selected factor (programmable) of from 0 to 0.9. Connected in tandem, four of these units effectively provide multiplication by a four digit number which may vary from 0.0000 to 0.9999, depending upon the combination of ones and zeroes available in the digital code at the control inputs to these devices. For example, programming a series of four scalers of the type described for a factor of 0.4875 results in 4,875 output pulses being produced for every 10,000 input pulses received.

From the above description and, as more fully expanded upon in the manufacturer's specification sheets for the programmable dividers and scalers, which specification sheets are incorporated by reference herein, it will be apparent that the programming of the dividers 168 and scaler circuits 190 is a straight-forward switching and gating problem within the skill of the art. Therefore, the gates and switches performing this function are diagrammatically illustrated as a program switching circuit 192, having a plurality of outputs 194 connected to the control inputs 196 of the dividers 168. Similarly, the program switching circuit 192 has a second set of outputs 198 connected to the control inputs 199 of the scaler multipliers and dividers in the circuit 190.

The binary code of the programmed outputs 194 and 198, and therefore the divider and scaler factors of the circuits 168 and 190, are capable of assuming three possible states corresponding to the high, intermediate and low flow rates at which a given meter is tested. To this end, there is shown in FIG. 5 three control lines 200, 201 and 202 respectively energized during the high, intermediate and low flow rate testing periods. Signals received on the control lines 200–202 drive the program switching circuit 192 to the three possible states referred to above.

As stated previously, an accurate measurement of meter performance is achieved by counting the number of pulses emanating from the oscillator 162 during a measuring interval defined by the receipt of a measured volume of fluid in a predetermined one of the tanks 22, 26 or 30 as defined by the activation of the sensors 102 and 104 associated with that tank. To this end, a plurality of decade counters 204–207 are provided for receiving the oscillator output pulses, scaled in frequency, from the output 191 of the scaler circuit 190. The decade counters 204–207 are connected in tandem and provide, in binary coded decimal (BCD) form, a digital representation of the units, tens, hundreds and thousands digits of the number N of pulses received from the scaler circuit 190. Each of the decade counters 204–207 has a four terminal output, designated 208–211 respectively, providing a BCD representation of a decimal digit registered by that counter. Each of the counters 204–207 additionally has a reset input R driven in parallel with the reset input R of control flip-flop 150 from the output 151 of the gates 152. As such, the counters are returned to the zero state upon the occurrence of a pulse at the output 151 from the gates 152. For gating and interfacing the BCD outputs 208–211 from the counters 204–207 to a card printer 214, there is provided a series of BCD buffers 216–219 respectively. Buffers 216–219 are activated upon receipt of a level change at a gate input 220 to provide for the printer 214 a proper logic level of the BCD coded signals at the counter outputs 208–211.

The decade counter units 204–207 and the buffer-gate units 216–219 are commercially available in compatible form from various manufacturers and are well known to those skilled in the art. Examples of such devices are CD4029AE and CD4009AE of the COS/MOS series sold by Radio Corporation of America.

The printer unit 214 provides an output indication of the number of counts registered in the counters 204–207 and is responsive directly to the BCD outputs of the buffers 216–219 to produce a four digit decimal indication. It will be appreciated by one skilled in the art that any number of different output indicators could be provided to perform a similar function, i.e., indicating a number. However, it has been found that a card printer model 85DP sold by Electro General Corporation is particularly appropriate for this application in that it will print a card of a size and format well suited for attachment to each tested meter after the testing is completed. In the embodiment shown a print control circuit 224 is represented as providing an output 225 to actuate the printer in response to a print start pulse at an input 226. The start pulse at the input 226 is provided from the output Q from the flip-flop 150 at the same time that a pulse is provided to the gate input 220 of the BCD buffer circuits 216–219.

At the completion of printing the print control circuit 224 produces a signal at an output 228 to initiate the next step in the testing cycle.

For controlling the timing of the meter measuring operation as a whole, there is provided a three-state cycling shift register 230 having first, second and third outputs 231, 232, and 233 respectively activated during the high, intermediate, and low flow rate tests. Switching apparatus represented as a test start device 120 provides an output pulse on a line 236 at the beginning of a test cycle. This pulse effectively establishes the initial condition for the testing cycle by setting the first stage of the register 230 to the active condition via an input S thereto and resetting the second and third stages to the inactive condition via inputs R thereto. Thereafter, and until the completion of the testing cycle, the clock pulses for the terminal C are produced by the print control circuit 224 at the end of each printing cycle and delivered to the register 230 via a clock control line 238. As a result, a measuring system, and more specifically the shift register 230 responds to the successively occurring completions of the printing operation to step the system from the high, to the intermediate, and finally to the low, flow rate testing stages of the testing cycle.

Finally, for the purposes of controlling the primary flow through the stand and the selection of the successive flow rates and corresponding receptacle tanks, there is provided in a typical system a plurality of solenoid controlled valves and other fluid control apparatus indicated generally at 244 as having a functional connection 246 with the tanks 22, 26 and 30. These controls 244 correspond to the combined controls indicated at 126, 128 and 130 in FIG. 2. The selection of appropriate flow rates and tanks is controlled in response to the activation of the high, intermediate and low flow rate lines 200, 201 and 202 from the register 230.

Before proceeding to a description of the operation of the electronic apparatus shown in FIG. 5, it is noted that the operation to be described is for an embodiment in which the scaler circuit 190 is comprised of a first programmable divider capable of assuming a divisor N1 of from 0 to 9, a series of programmable scaler units for multiplication by a selected factor M1 of from 0.0000 to 0.9999 and a second fixed divider at the output of the scaler units providing division by a factor of ten. The divider unit 168 in the example to be described actually comprises two programmable dividers, a first being the first divider of the scaler unit 190 providing a division factor N1 and a second divider providing a selected division factor N2 of from 0 to 999. The concept of using a plurality of dividers and multipliers as described is shown in FIG. 2 wherein the factors M1, N1 and N2 are supplied by devices 250, 251 and 252 respectively in response to a plurality of coded input signals on lines 254, 255 and 256.

Also, it will again be observed that the operating frequency for the voltage controlled oscillator 162 ideally remains constant, namely at 500 Hz, for each of the three flow rates at which the meter is tested. Similarly, the output reading from the printer 214 for each of the three flow rates is approximately the same and, for an ideal meter, will be 100.0. Any variation in the output frequency from the oscillator 162 due to an inaccuracy in the meter being tested, at any test flow rate, results in a deviation of the final output count from the number 100.0 during that test flow so as to present to the operator an indication of meter accuracy by percent for that meter at that test flow rate.

Since the flow rates from high to low vary by approximately an order of magnitude, however, the divider and multiplier programming, tank selection, and valve control functions are coordinated to maintain the relationships defined by the previous paragraph, namely, that an ideal meter will, at each range, produce an output frequency from the oscillator 162 at approximately 500 Hz and a printer readout of 100.0.

The following table sets forth the divider and multiplier factors N1, N2 and M1 for the circuits 168 and 190 for the high, intermediate and low flow rate of a typical test setup for the 25 gpm meter referred to in Table I. Other pertinent data for the test setup, including sensor frequency, actual flow rate and measured volumes is also included.

TABLE II

| | Rate GPM | Measured Volume Ft. 3 | Measured Time (Min) | Sensor f(Hz) (Idealized) | N1 | N2 | M1 | Oscillator Center Frequency $f_o$ |
|---|---|---|---|---|---|---|---|---|
| High | 25.0 | 5.0 | 1.496 | 41.316 | 4 | 3 | .898 | 495.8 |
| Intermediate | 1.0 | 0.1 | 0.748 | 1.652 | 2 | 151 | .892 | 499.1 |
| Low | 0.25 | 0.1 | 2.992 | 0.413 | 8 | 151 | .892 | 499.1 |

Although a more comprehensive description of the operation of this system appears elsewhere herein, for the examples set forth in the table above the following operational sequence takes place. At the initiation of the test sequence, the cycling register 230 is inactive, the flip-flop 150 is in the set condition ($Q = 1$ and $\bar{Q} = 0$), and the gate 186 is closed. Flow meters M to be tested are in place on the stand 20, the stand is closed, the meters are purged, the probes 92 are positioned adjacent the meters on the stand, and the switches 160 are set to the appropriate sensors 92 and related circuitry 158 by controls 122 and 124. Flow through the meters is established at the high flow rate as the test start switch 120 is activated.

The first stage of the shift register 230 is activated to the 1 condition as a result of the pulse supplied to its inputs from the line 236 upon activation of the test start switch 120. The program switching device 192 reacts to the resulting activation of the high rate input lead 200 to provide control voltages to the dividers 168 and 190 such that the division and scaler factors N1, N2 and M1 assume the values set forth in the above Table II for the high flow rate test. The signal from the respective magnetic sensor 92 is amplified by the circuit 158 and fed through the switch 160 to the phase detector 164. The phase lock loop rapidly synchronizes the output of the oscillator 162 with the magnetic sensor signal at the input 170 to the phase detector 164. However, the gate 186 leading to the counter remains closed until the water level in the high flow rate receptacle tank 30 reaches the first sensor 102.

Upon the achievement of the level of the first sensor 102 by the water level in the tank 30, a signal is fed through the gates 152 to the R input to the flip-flop 150, changing the state of the flip-flop such that $Q = 0$ and $\bar{Q} = 1$. Resetting the flip-flop 150 opens the gate 186 as the count in the decade counters 204–207 returns to zero for the initiation of the counting sequence. Pulses are fed from the oscillator 162 at a high frequency through the gate 186 of the scaler unit 190.

After appropriate frequency scaling in the circuit 190, the pulse train from the gate 186 is fed into the counter units 204–207, which begin to accumulate a decimal number representative of the number of pulses received. The BCD buffer and gate units 216–219 remain closed during accumulation of the count.

As the volume of water within the selected tank 30 increases to the level of the second or high level sensor 104 for that tank, a signal is produced by that sensor which is coupled through the appropriate tank select gates 152 to the input S for the flip-flop 150. The flip-flop is thereby toggled to the set condition in which $Q = 1$ and $\bar{Q} = 0$. In this state, the flip-flop 150 causes the gate 186 to close, terminating further accumulation of pulses in the counter units 204–207. Simultaneously, the $Q$ output from the flip-flop 150 actuates the gate input 220 of the buffer units 216–219 and the print control circuit 224 for the printer 214. Through means not shown the printer 214 responds to the BCD inputs from the buffers 216–219 to print out on a card or tag the number of counts in the counter units 204–207 in decimal form. Completion of the printing process is signaled by the production of a pulse at the PRINT COMPLETE output 228 from the print control circuit 224. This pulse passes to the clock input C of the shift register 230 and advances the register to its second state in which the output 232 containing the intermediate flow rate signal, is activated.

Initiation of the intermediate flow rate testing condition by the cycling register 230 causes the flow valve control unit 244 to mechanically activate the necessary valves as described to allow fluid to enter the second tank 26 at the intermediate flow rate set forth in Table II above. As stated previously, the volume of fluid collected in the second tank 26 as in tanks 22 and 30 is predetermined so that during the timed interval defined by the sensor signals developed at the tank sensors 102 and 104 a measured number of pulses will be accumulated in the counter units 204–207, which number of pulses, for an ideal meter, is 1,000.

Activation of the intermediate flow rate control line 201 also operates on the program switching device 192 to change the code at the inputs 196 and 199 to the divider and scaler units 168, 190 respectively. Each of the division factors set forth in the above table for the intermediate flow rate test is immediately established. The controlled oscillator 162, through the action of the phase locked loop in which it is incorporated, assumes a frequency and phase in synchronism with the sensor rate signal from the respective magnetic detector 92. Again it is emphasized that a change in the actual flow rate from 25 gpm to 1.0 gpm does not significantly effect the output frequency from the oscillator 162 due to the fact that the divider ratio of the unit 168, and hence the multiplication factor of the phase locked loop, vary in inverse proportion to that change. As the volume of fluid within the tank 26 increases to the level of the lower sensor 102, a signal is produced from the sensor which is fed through the gates 152 to line 151, causing resetting of the decade counters 204–207. The pulse on line 151 simultaneously is applied to the input R of the flip-flop 150, changing its state to the reset condition, thereby closing the gated buffer units 216–219 and opening the gate 186 to allow signals to flow from the oscillator 162 through the scaler unit 190 and thereafter to the counters 204–207. The counting cycle begins again. As the fluid in the tank 26 reaches the upper sensor 104, a signal is produced which changes the state of the flip-flop 150 to the set state, closing the gate 186 and actuating the printer 214 to reproduce in decimal form on the testing card the number registered in the counter units 204–207.

At the conclusion of printing, the cycling register 230 steps to its third state, in which the low flow rate control line 202 is activated to begin the third stage of the testing cycle. The flow valve control system 244 allows fluid to begin flowing into the low flow rate test tank 22. The program switching device 192 changes the code of the inputs 196 and 199 of the divider and scaler units 168 and 190 respectively to correspond to the necessary conditions for N1, N2 and M1 set forth in Table II for the low flow rate testing stage. Measurement of pulses from the oscillator 162 during a measuring interval defined by the receipt of pulses from the lower and upper sensors 102 and 104 of the tank 22 occurs in a manner similar to that already described for the high and intermediate flow rate measurements, and a third number is printed on the data card by the printer 214, this number corresponding to the accuracy factor by percent of the meter operating at the low fluid flow rate. At the conclusion of printing, a pulse from the print control circuit 224 steps the cycling register to an inactive condition and the entire testing apparatus is placed in readiness for the next test cycle to be initiated by operation of the test START device 120 and other cycle controls as referred to above.

A single channel of the meter monitoring and accuracy determining apparatus and its operation from the monitoring sensor to the printout have been described, with respect to the operation of one meter. However, as is indicated in part in FIG. 2, this apparatus is duplicated as necessary for the number of meters being tested simultaneously, e.g., eight meters as shown in FIG. 1. Moreover, the operations of the monitoring, comparing, computing and printout mechanisms for the several meters occur simultaneously, such that the operational metering accuracy of each meter on a test stand is separately determined simultaneously with the accuracy determination of each other meter on the stand, and a separate printed record is generated of the accuracy determination for each meter. Of course, the number of channels may be varied as desired in accordance with the number of meters to be tested simultaneously.

Various other modifications of the specific embodiment shown and described may be made without departing from the spirit and scope of this invention. By way of example only, and without limitation, the meter operation sensors may be mounted in other ways, various test stands may be used, a single prover tank may be used for more than one flow rate test by appropriate positioning and switching of the volume sensors, more than one flow rate control may be imposed in a given conduit and hence plural flow rate tests may be effected through a single line by selection of the various controls, other measured volume sensors may be utilized, and other specfic sequencing, computing and recording components may be utilized.

It will be seen that improved apparatus and methods have been provided which meet the aforestated objects.

While a particular embodiment of this invention is shown and described herein, it will be understood, of course, that the invention is not to be limited thereto since many modifications may be made, particularly in light of the foregoing teachings. It is contemplated, therefore, by the appended claims to cover any such modifications as fall within the true spirit and scope of this invention.

What is claimed is:

1. Apparatus for testing a flow meter comprising: means for establishing a flow of fluid through the meter being tested at a predetermined rate; a receptacle for said fluid; quantitative sensing means associated with said receptacle for generating a pair of signals respectively at the beginning and end of receipt of a predetermined volume of fluid, said signals defining a measuring interval; transducer means positionable adjacent the tested meter for producing a first rate signal corresponding to the actual rate of registration of the tested meter; controlled oscillator means responsive to said first rate signal for producing a second rate signal which varies at a frequency proportional to but at least an order of magnitude in excess of said registration rate, said controlled oscillator means including a voltage controlled oscillator having a nominal output frequency at least an order of magnitude in excess of the frequency of registration of said meter, frequency division means coupled to said oscillator for dividing said second rate signal in frequency to produce a phase reference signal having a frequency approximating the desired frequency for said first rate signal, a phase detector for receiving said first rate signal and said phase reference signal and for providing an output signal varying with the difference in phase between said first rate signal and said phase reference signal, and means responsive to said phase detector output signal to provide an oscillator control signal the voltage of which varies with said phase difference to increase or decrease, respectively, said oscillator output frequency as the frequency of said first rate signal becomes greater or less than the frequency of said reference signal; counting means controlled by said quantitative sensing means for counting the cycles of said second rate signal occurring during said measuring interval; and an output device for indicating the count in said counting means at the end of said measuring interval.

2. The flow meter testing apparatus according to claim 1 wherein said phase detector provides an output signal in the form of a pulse train which varies in pulse width in accordance with said phase difference and wherein said signal conversion means is an integrator responsive to said pulse train for producing a DC signal varying in sense and magnitude with said pulse width.

3. Apparatus for testing a flow meter comprising: programmable means for selectively establishing fluid flow through the meter being tested at a plurality of predetermined rates, receptacle means for receiving fluid passing through said meter, quantitative sensing means associated with said receptacle means for generating a pair of signals respectively at the beginning and end of receipt of a preselected volume of fluid, said signals defining a preselected measuring interval, transducer means positionable adjacent the tested meter for producing a first rate signal corresponding to the actual rate of registration of the tested meter, controlled oscillator means responsive to said first rate signal for producing a second rate signal which varies at a frequency proportional to but at least an order of magnitude in excess of said registration rate, counting means controlled by said quantitative sensing means for counting the cycles of said second rate signal occurring during said preselected measuring interval, and an output device for indicating the count in said counting means at the end of said preselected measuring interval.

4. Flow meter testing apparatus according to claim 3 wherein said controlled oscillator means includes a voltage controlled oscillator having a nominal output frequency at least an order of magnitude in excess of the frequency of registration of said meter, frequency division means coupled to said oscillator for dividing said second rate signal in frequency to produce a phase reference signal having a frequency approximating the desired frequency for said first rate signal, a phase detector for receiving said first rate signal and said phase reference signal and for providing an output signal varying with the difference in phase between said first rate signal and said phase reference signal, and means responsive to said phase detector output signal to provide an oscillator control signal the voltage of which varies with said phase difference to increase or decrease, respectively, said oscillatory frequency as the frequency of said first rate signal becomes greater or less than the frequency of said reference signal.

5. Flow meter testing apparatus according to claim 2 wherein said flow establishing means is programmable to provide flow rates in a plurality of ranges and wherein said frequency division means is programmable to a plurality of division factors, said apparatus further including program sequencing means jointly operative on said flow establishing means and said frequency division means for sequentially adjusting the division factor of said divider means in inverse relation to the changes in the selected flow rate such that said oscillator output frequency for an ideal meter remains essentially constant for testing at varying flow rates in the testing cycle.

6. Flow meter testing apparatus according to claim 3 further including frequency scaling means operatively associated with said quantitative sensing means and coupled between said oscillator means and said counting means for effectively multiplying the frequency of said second rate signal by a factor which, for an ideal meter, results in a thousand pulses being registered by said counting means during each selected measuring interval such that a variation in meter performance from the ideal results in pulse counts ocrrespondingly varying from a thousand by a percentage representing the actual meter performance error.

7. Apparatus for testing flow meters in accordance with claim 3 further including control means responsive to said quantitative sensing means and operatively associated with said programmable means for sequentially changing the rate of fluid flow through said meter to a successive one of said predetermined rates at the end of each of said measuring intervals.

8. Apparatus for testing flow meters in accordance with claim 7 wherein said control means is operatively associated with said counting means and resets said counting means to the zero count in advance of each of said measuring intervals.

9. Apparatus for testing a flow meter comprising:
means for establishing a flow of fluid through the meter being tested at a predetermined rate, a receptacle for said fluid, quantitative sensing means associated with said receptacle for generating a pair of signals respectively at the beginning and end of receipt of a predetermined volume of fluid, said signals defining a measuring interval, transducer means positionable adjacent the tested meter for producing a first rate signal corresponding to the actual rate of registration of the tested meter, controlled oscillator means responsive to said first rate signal for producing a second rate signal which varies at a frequency proportional to but at least an order of magnitude in excess of said registration rate, counting means controlled by said quantitative sensing means for counting the cycles of said second rate signal occurring during said measuring interval, frequency scaling means operatively associated with said quantitative sensing means and coupled between said oscillator means and said counting means for effectively multiplying the frequency of said second rate signal by a factor which, for an ideal meter, results in a thousand pulses being registered by said counting means during a measuring interval such that a variation in meter performance from the ideal results in pulse counts correspondingly varying from a thousand by a percentage representing the actual meter performance error, and an output device for indicating the count in said counting means at the end of said measuring interval.

* * * * *

UNITED STATES PATENT OFFICE
CERTIFICATE OF CORRECTION

PATENT NO. : 3,940,971

DATED : March 2, 1976

INVENTOR(S) : Marvin W. Krause; Donald H. Strobel & Edward A. Seruga

It is certified that error appears in the above-identified patent and that said Letters Patent are hereby corrected as shown below:

Column 14, line 48 "the" (second occurrence) should read -- that --. Column 17, claim 5, line 11, "2" should read -- 4 --. Column 17, claim 6, line 34, correct the spelling of "correspondingly."

Signed and Sealed this

Sixth Day of July 1976

[SEAL]

Attest:

RUTH C. MASON
*Attesting Officer*

C. MARSHALL DANN
*Commissioner of Patents and Trademarks*